United States Patent
Messick et al.

(10) Patent No.: US 10,620,692 B2
(45) Date of Patent: Apr. 14, 2020

(54) SYSTEM AND METHOD OF OPERATING ONE OR MORE INFORMATION HANDLING SYSTEMS

(71) Applicant: Dell Products L.P., Round Rock, TX (US)

(72) Inventors: Douglas Evan Messick, Austin, TX (US); Aaron Michael Rhinehart, Georgetown, TX (US); Craig Anthony Klein, Elgin, TX (US)

(73) Assignee: Dell Products L.P., Round Rock, TX (US)

( * ) Notice: Subject to any disclaimer, the term of this patent is extended or adjusted under 35 U.S.C. 154(b) by 69 days.

(21) Appl. No.: 16/052,270

(22) Filed: Aug. 1, 2018

(65) Prior Publication Data
US 2020/0042074 A1  Feb. 6, 2020

(51) Int. Cl.
*G06F 1/3287* (2019.01)
*G06F 1/18* (2006.01)

(52) U.S. Cl.
CPC ............ *G06F 1/3287* (2013.01); *G06F 1/181* (2013.01)

(58) Field of Classification Search
CPC .... G06F 13/24; G06F 9/4812; G06F 11/1461; G06F 1/30
USPC ............................ 710/262, 49; 713/340, 310
See application file for complete search history.

(56) References Cited

U.S. PATENT DOCUMENTS

| | | | |
|---|---|---|---|
| 2006/0132190 A1* | 6/2006 | Driediger | G01R 23/005 327/47 |
| 2014/0001871 A1* | 1/2014 | Vogman | H02M 1/32 307/82 |
| 2014/0183959 A1* | 7/2014 | Kabasawa | H02J 9/061 307/66 |
| 2015/0381237 A1* | 12/2015 | Griffith | H04B 3/546 375/258 |
| 2017/0031850 A1* | 2/2017 | Axnix | G06F 9/4843 |
| 2018/0115237 A1* | 4/2018 | Morin | H02M 3/156 |
| 2018/0137052 A1* | 5/2018 | Boyle | G06F 12/084 |

OTHER PUBLICATIONS

PMBus Power System Management Protocol Application Note AN001, Using the Zone_Read and Zone-Write Protocols, System Management Interface Forum, Jan. 1, 2016; 81 pages.

(Continued)

*Primary Examiner* — Faisal M Zaman
(74) *Attorney, Agent, or Firm* — Baker Botts L.L.P.

(57) ABSTRACT

In one or more embodiments, one or more systems, processes, and/or methods may determine first power supply units associated with a first power supply grid of power supply grids that are configured to provide power to information handling systems (IHSs) and second power supply units associated with a second power supply grid of the power supply grids; may determine that the power supply grids are configured for grid redundancy; may determine that a number of operational power supply units of the first power supply units meets a minimum number of operational power supply units to provide power to the IHSs; may determine that a number of operational power supply units of the second power supply units not the minimum number of operational power supply units; and may suppress an alert of at least one of the second power supply units that is not operational to provide power to the IHSs.

20 Claims, 6 Drawing Sheets

(56) References Cited

OTHER PUBLICATIONS

PMBus Power System Management Protocol Specification Part II—Command Language, System Management Interface Forum, Mar. 28, 2005; 81 pages.
PMBus Power System Management Protocol Specification Part II—Command Language, System Management Interface Forum, Mar. 18, 2014; 120 pages.
PMBus Application Profile for AC/DC Server Power Supplies, Apr. 16, 2012; 19 pages.
System Management Bus Specification, Smart Battery System Specifications, Feb. 15, 1995; 23 pages.
System Management Bus (SMBus) Specification, System Management Interface Forum, Dec. 20, 2014; 85 pages.

\* cited by examiner

SYSTEM AND METHOD OF OPERATING ONE OR MORE INFORMATION HANDLING SYSTEMS

BACKGROUND

Field of the Disclosure

This disclosure relates generally to information handling systems and more particularly to operating one or more information handling systems with multiple power supply units.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may determine, from grid configuration information, first power supply units associated with a first power supply grid of power supply grids that are configured to provide power to information handling systems and second power supply units associated with a second power supply grid of the power supply grids; may determine from the grid configuration information that the power supply grids are configured for grid redundancy; may determine that a number of operational power supply units of the first power supply units associated with the first power supply grid meets a minimum number of operational power supply units to provide power to the information handling systems; may determine that a number of operational power supply units of the second power supply units associated with the second power supply grid does not the minimum number of operational power supply units to provide power to the information handling systems; and may suppress an alert of at least one of the second power supply units associated with the second power supply grid that is not operational to provide power to the information handling systems. For example, suppressing an alert of at least one of the second power supply units associated with the second power supply grid that is not operational to provide power to the information handling systems may be performed in response to determining that the number of operational power supply units of the second power supply units associated with the second power supply grid does not the minimum number of operational power supply units to provide power to the information handling systems.

In one or more embodiments, suppressing the alert of the at least one of the second power supply units associated with the second grid may include configuring the at least one of the second power supply units associated with the second grid to not assert the alert. For example, configuring the at least one of the second power supply units associated with the second grid to not assert the alert may include configuring a register of the at least one of the second power supply units associated with the second grid. For instance, a configuration of the register of the at least one of the second power supply units associated with the second grid may suppress generating the alert. In one or more embodiments, configuring the register of the at least one of the second power supply units associated with the second grid may include providing, to a power management bus, a command that configures the register of the at least one of the second power supply units associated with the second grid which suppresses generating the alert.

In one or more embodiments, the one or more systems, methods, and/or processes may further receive an alert from a power supply unit of the first power supply units associated with the first power supply grid; may further determine that the number of operational power supply units of the first power supply units associated with the first power supply grid does not meet the minimum number of operational power supply units to provide power to the information handling systems; and may further reduce a consumption of power of at least one of the information handling systems. In one example, determining that the number of operational power supply units of the first power supply units associated with the first power supply grid does not meet the minimum number of operational power supply units to provide power to the information handling systems may be performed in response to receiving the alert from the power supply unit of the first power supply units associated with the first power supply grid. In another example, reducing a consumption of power of at least one of the information handling system may be performed in response to determining that the number of operational power supply units of the first power supply units associated with the first power supply grid does not meet the minimum number of operational power supply units to provide power to the information handling systems.

In one or more embodiments, reducing the consumption of power of at least one of the information handling systems may include reducing an information processing capacity of the at least one of the information handling systems. In one or more embodiments, determining that a number of operational power supply units of the second power supply units associated with the second power supply grid does not the minimum number of operational power supply units to provide power to the information handling systems may include a redundancy sensor determining that the number of operational power supply units of the second power supply units associated with the second power supply grid does not the minimum number of operational power supply units to provide power to the information handling systems.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, one or more information handling systems may utilize power supply unit (PSU) redundancy. In one or more embodiments, a power supply system of one or more information handling systems may utilize grid redundancy. For example, one or more information handling systems may include and/or utilize multiple grids. For instance, the one or more information handling systems may utilize a first grid, while a second grid may be a redundant and/or utilized if an issue occurs with the first grid. In one or more embodiments, an issue may occur with a grid of the multiple grids. In one example, one or more information handling systems may be throttled. In one instance, throttling one or more information handling systems may include configuring at least one of the one or more information handling systems to consume less power. In another instance, throttling one or more information handling systems may include configuring at least one of the one or more information handling systems to process less information within a time period. In another example, one or more information handling systems may not be throttled. For instance, if at least one grid is operational to supply power to the one or more information handling systems, then the one or more information handling systems may be operated without throttling the one or more information handling systems.

In one or more embodiments, a power supply utilized with one or more information handling systems may be power management bus (PMBus) compliant. For example, the power supply utilized with the one or more information handling systems may be compliant with a PMBus specification. For instance, a power supply utilized with one or more information handling systems may implement smart ride-through (SmaRT). In one or more embodiments, SmaRT may detect one or more issues and may alert one or more information handling systems based at least on the one or more issues. For example, the one or more issues may include one or more of input under-voltage, brownout, and dropout, among others. In one or more embodiments, SmaRT may provide an alert to one or more information handling systems in response to detecting one or more issues. For example, SmaRT may assert an interrupt signal in response to detecting one or more issues. In one or more embodiments, a PMBus may include one or more features of a system management bus (SMBus). For example, SmaRT may assert an interrupt signal, which may be referred to as "SMBAlert #", in response to detecting one or more issues. For instance, SMBAlert # may be utilized by slave devices to alert a host device to one or more events. In one or more embodiments, a PSU may be or include a slave PMBus device.

In one or more embodiments, an SMBAlert # may cause one or more information handling systems to be throttled. For example, one or more issues associated with a PSU may be detected, and an SMBAlert # may be asserted. For instance, one or more information handling systems may be throttled in response to an assertion of an SMBAlert #. In one or more embodiments, throttling an information handling system may cause one or more components of the information handling system to consume less power than the one or more components of the information handling system would before throttling the information handling system. For example, a processor of the information handling system may be configured to consume less power when the information handling system is throttled. For instance, the processor may process less information per time period when it is configured to consume less power.

In one or more embodiments, a PSU may be configured to respond to detecting one or more issues. For example, the PSU may be configured respond to detecting one or more issues based at least on a system configuration and/or based at least on one or more user expectations, among others. In one or more embodiments, an SMBAlert # may be masked. For example, masking an SMBAlert # may include configuring a PSU to not assert an interrupt signal in response to detecting one or more issues. In one or more embodiments, selectively enabling or disabling throttling of an information handling system may include masking or unmasking an SMBAlert #. In one example, if an information handling system is configured to be throttled in response to an SMBAlert # of a PSU, then masking the SMBAlert # of the PSU may permit the information handling system to process information without being throttled. In another example, if an information handling system is configured to be throttled in response to an SMBAlert # of a PSU, then unmasking the SMBAlert # of the PSU may permit the information handling system to process information while being throttled. For instance, the information handling system may ride through a drop in power by throttling.

In one or more embodiments, multiple power supply units (PSUs) may be configured as grid redundant. For example, the multiple PSUs may be configured as multiple grids. In one or more embodiments, if at least one of the multiple grids includes a sufficient number of operational PSUs to provide power to one or more information handling systems of a system, the one or more information handling systems may not be throttled. For instance, the system may include a chassis that houses the one or more information handling systems. In one or more embodiments, a chassis may include multiple PSUs. For example, the chassis may include six PSUs, which may be configured as grid redundant. For instance, a first grid may include three PSUs of the six PSUs, and a second grid may include the other three PSUs of the six PSUs. In one or more embodiments, a configuration of the chassis may include a minimum number of operational PSUs to operate without throttling one or more information handling systems of the chassis. For example, the first grid may include three operational PSUs, and the second grid may include two operational PSUs (e.g., one of the PSUs may not be operational or may have other one or more issues). For instance, an operational PSU population may be referred to as "3+2". In one or more embodiments, a redundancy determination may determine that redundancy is not available. For example, the redundancy determination may determine that the second grid may not be able to provide power to the chassis, without throttling one or more information handling systems, if the first grid is lost. For instance, the redundancy determination may determine that the second grid may not support its three PSU configuration. In one or more embodiments, throttling may not occur as the first grid includes a number of operational PSUs to provide power to the one or more information handling systems.

Figure 1:
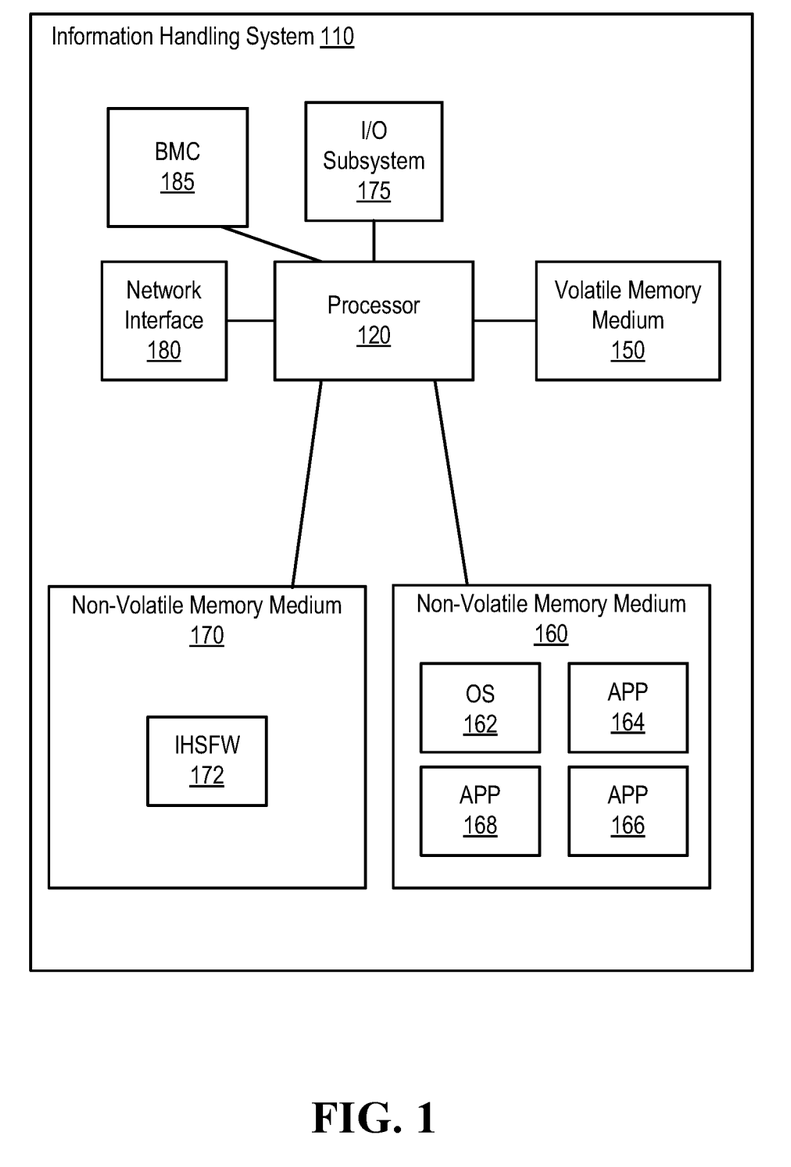
FIG. 1 illustrates an example of an information handling system, according to one or more embodiments.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and a baseboard management controller (BMC) 185. As illustrated, volatile memory medium 150, non-volatile memory media 160 and 170, I/O subsystem 175, network interface 180, and BMC 185 may be communicatively coupled to processor 120.

In one or more embodiments, one or more of volatile memory medium 150, non-volatile memory media 160 and 170, I/O subsystem 175, network interface 180, and BMC 185 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150-170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, BMC 185 may be or include a remote access controller. For example, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC). In one or more embodiments, a remote access controller may include one or more of a processor, and a memory, a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. For example, the remote access controller may be based at least on an Intelligent Platform Management Interface (IPMI) standard. For instance, the remote access controller may allow and/or permit utilization of IPMI out-of-band interfaces such as IPMI Over LAN (local area network). In one or more embodiments, a remote access controller may include and/or provide one or more internal private networks. For example, the remote access controller may include and/or provide one or more of an Ethernet interface, a front panel USB interface, and a Wi-Fi interface, among others.

In one or more embodiments, BMC 185 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 185 may be configured, coded, and/or encoded with instructions in accordance with one or more of systems, flowcharts, methods, and/or processes described herein. In one or more embodiments, BMC 185 may be or include one or more of a field programmable gate array (FPGA) and an ASIC, among others, configured, coded, and/or encoded with instructions in accordance with one or more of systems, one or more flowcharts, one or more methods, and/or one or more processes described herein.

In one or more embodiments, processor 120 and one or more components of IHS 110 may be included in a system-on-chip (SoC). For example, the SoC may include processor 120 and a platform controller hub (not specifically illustrated).

Figure 2:
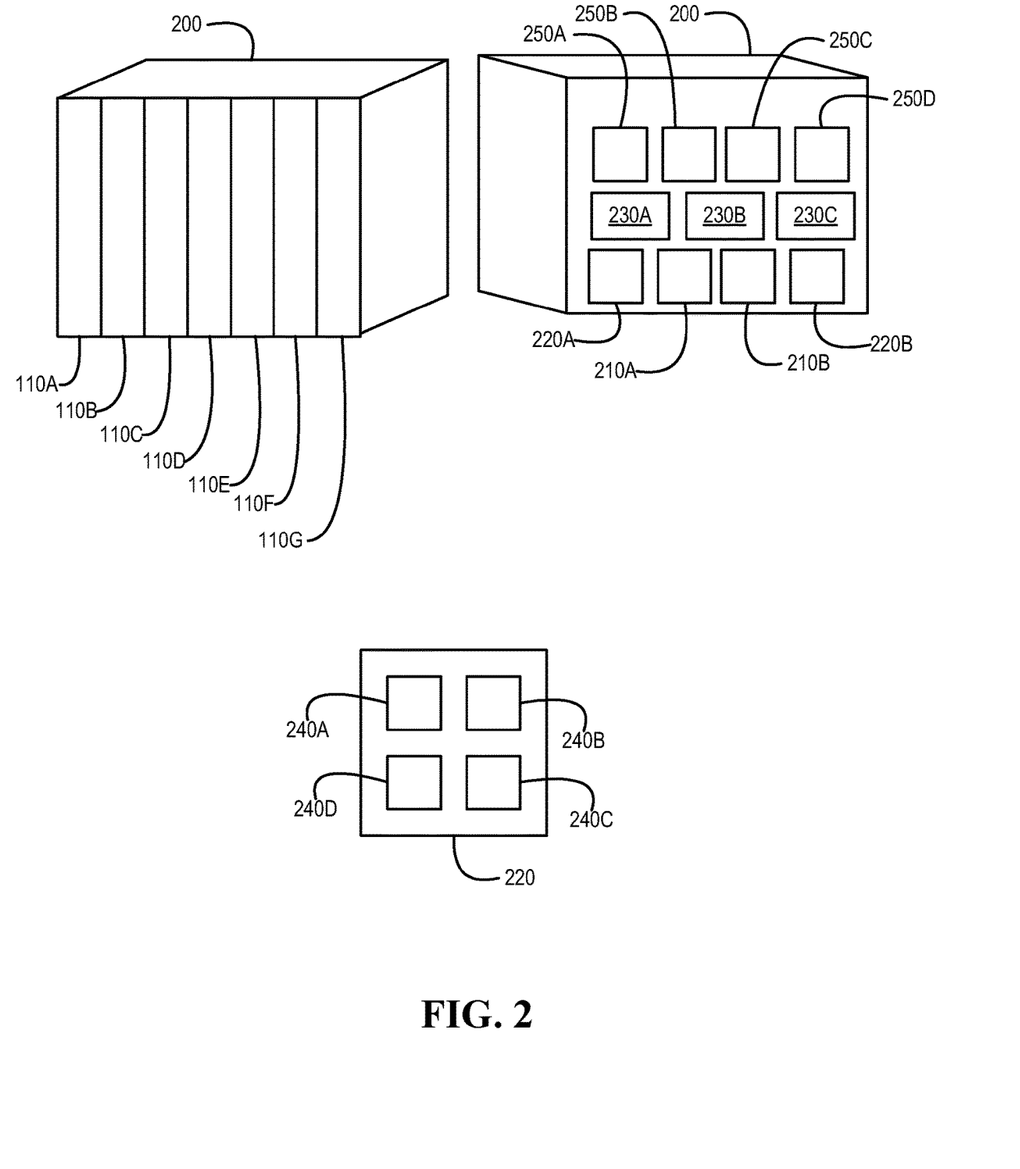
FIG. 2 illustrates an example of an information handling system chassis, according to one or more embodiments.

Turning now to FIG. 2, an example of an information handling system chassis is illustrated, according to one or more embodiments. As shown, an information handling system chassis 200 may include and/or may be configured to include multiple information handling systems (IHSs). For example, chassis 200 may and/or may be configured to include IHSs 110A-110G. For instance, one or more of IHSs 110A-110G may be removable. In one or more embodiments, a first IHS 110 may be swapped for a second IHS 110, different from the first IHS 110.

In one or more embodiments, chassis 200 may include one or more enclosure controllers. As illustrated, chassis 200 may include enclosure controllers (ECs) 210A and 210B. In one or more embodiments, chassis 200 may include one or more power supply nodes (PSNs). As shown, chassis 200 may include PSNs 220A and 220B. In one or more embodiments, a power supply node (PSN) 220 may include one or more power supply units (PSUs) 240. For example, a PSN 220 may include multiple power PSUs 240A-240D. For instance, if one of the multiple PSUs is associated with an issue, PSN 220 may continue to provide power to chassis 200 via one or more other PSUs. In one or more embodiments, one or more of PSNs 220A and 220B may be removable. For example, a first PSN 220 may be swapped for a second PSN 220, different from the first PSN 220. In one instance, the first PSN 220 may be swapped for the second PSN 220 without ceasing operations of one or more of IHSs 110A-110G. In another instance, the first PSN 220 may be swapped for the second PSN 220 without throttling one or more of IHSs 110A-110G.

In one or more embodiments, chassis 200 may include one or more fans. For example, the one or more fans may provide airflow through various one or more portions of chassis 200. For instance, the airflow through various one or more portions of chassis 200 may remove heat from one or more portions of chassis 200 and/or one or more portions of one or more IHSs 110. As illustrated, chassis 200 may include fans 230A-230C. In one or more embodiments, an enclosure controller (EC) 210 may monitor one or more fans 230, one or more temperatures of one or more portions of chassis 200, one or more PSUs 240, and/or one or more PSNs 220, among others. For example, two or more of EC 210, a fan 230, a temperature determining device, a PSU 240, and a PSN, among others, may be coupled to a PMBus. For instance, two or more of EC 210, a fan 230, a temperature determining device, a PSU 240, and a PSN, among others, may communicate via a PMBus. In one or more embodiments, EC 210 may control one or more portions and/or one or more components of chassis 200. In one or more embodiments, EC 210 may include one or more structures and/or one or more functionalities as those described with reference to IHS 110. In one or more embodiments, EC 210 may include one or more structures and/or one or more functionalities as those described with reference to BMC 185. In one or more embodiments, EC 210 may be configured, coded, and/or encoded with instructions in accordance with one or more of systems, flowcharts, methods, and/or processes described herein.

In one or more embodiments, chassis 200 may include one or more non-volatile memory media. For example, chassis 200 may include non-volatile memory media 250A-250D. In one or more embodiments, a non-volatile memory medium 250 may include one or more structures and/or one or more functionalities as those described with reference to non-volatile memory medium 160. In one or more embodiments, one or more of non-volatile memory media 250A-250D may provide storage for one or more of IHSs 110A-110G.

Figure 3:
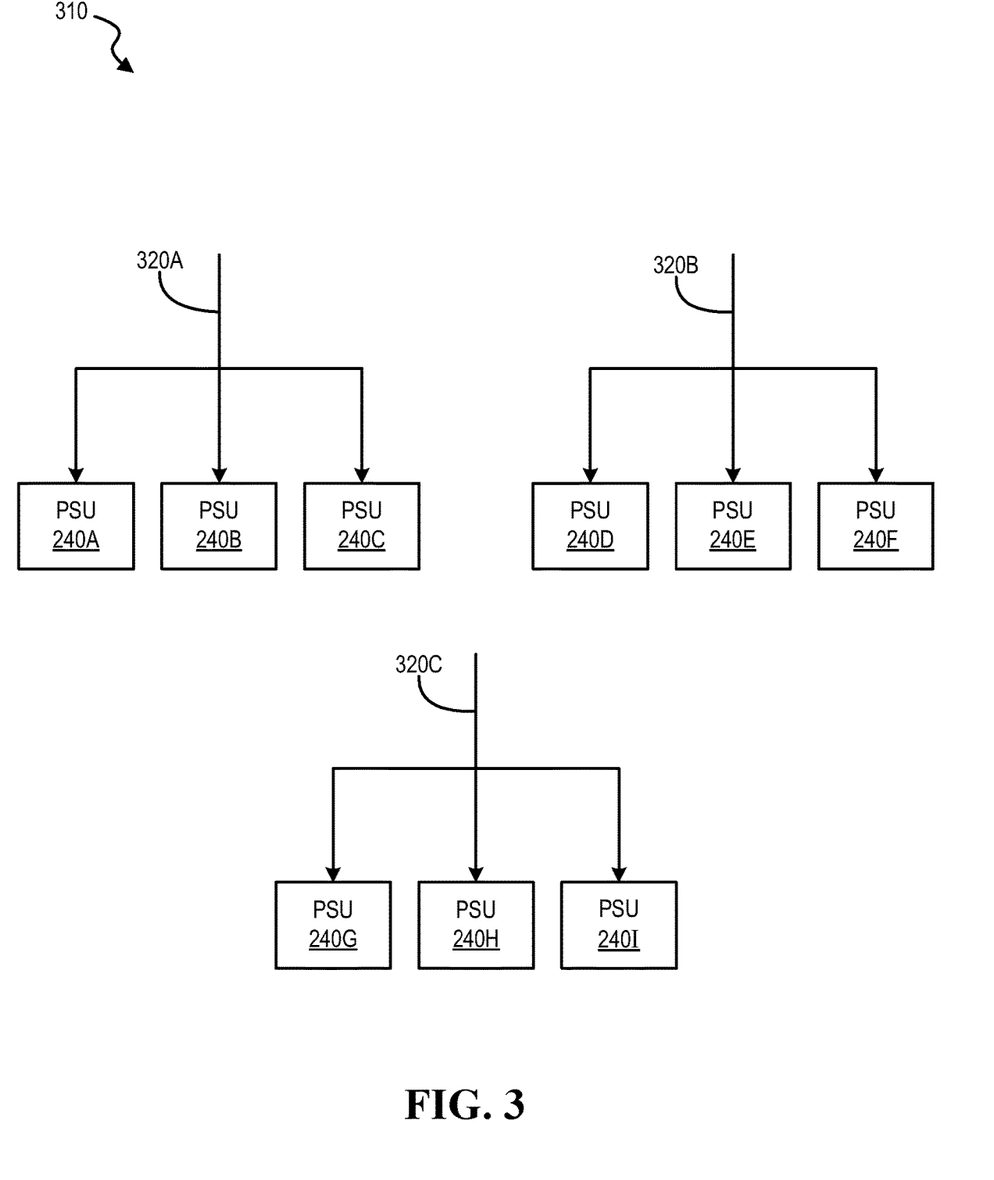
FIG. 3 illustrates an example of a power supply system, according to one or more embodiments.

Turning now to FIG. 3, an example of a power supply system is illustrated, according to one or more embodiments. As shown, a power supply system 310 may include power supply grids 320A-320C. In one or more embodiments, chassis 210 may house power supply system 310. In one or more embodiments, IHS 110 may house power supply system 310. As illustrated, power supply grid 320A may include PSUs 240A-240C. As shown, power supply grid 320B may include PSUs 240D-240F. As illustrated, power supply grid 320C may include PSUs 240G-240I. In one or more embodiments, chassis 210 may house one or more of power supply grids 320A-320C. In one or more embodiments, IHS 110 may house one or more of power supply grids 320A-320C. In one or more embodiments, one or more of PSUs 240A-240I may be removable. For example, a first PSU 240 may be swapped for a second PSU 240, different from the first PSU 240. In one instance, the first PSU 240 may be swapped for the second PSU 240 without ceasing operations of one or more of IHSs 110A-110G. In another instance, the first PSU 240 may be swapped for the second PSU 240 without throttling of one or more of IHSs 110A-110G.

Figure 4A:
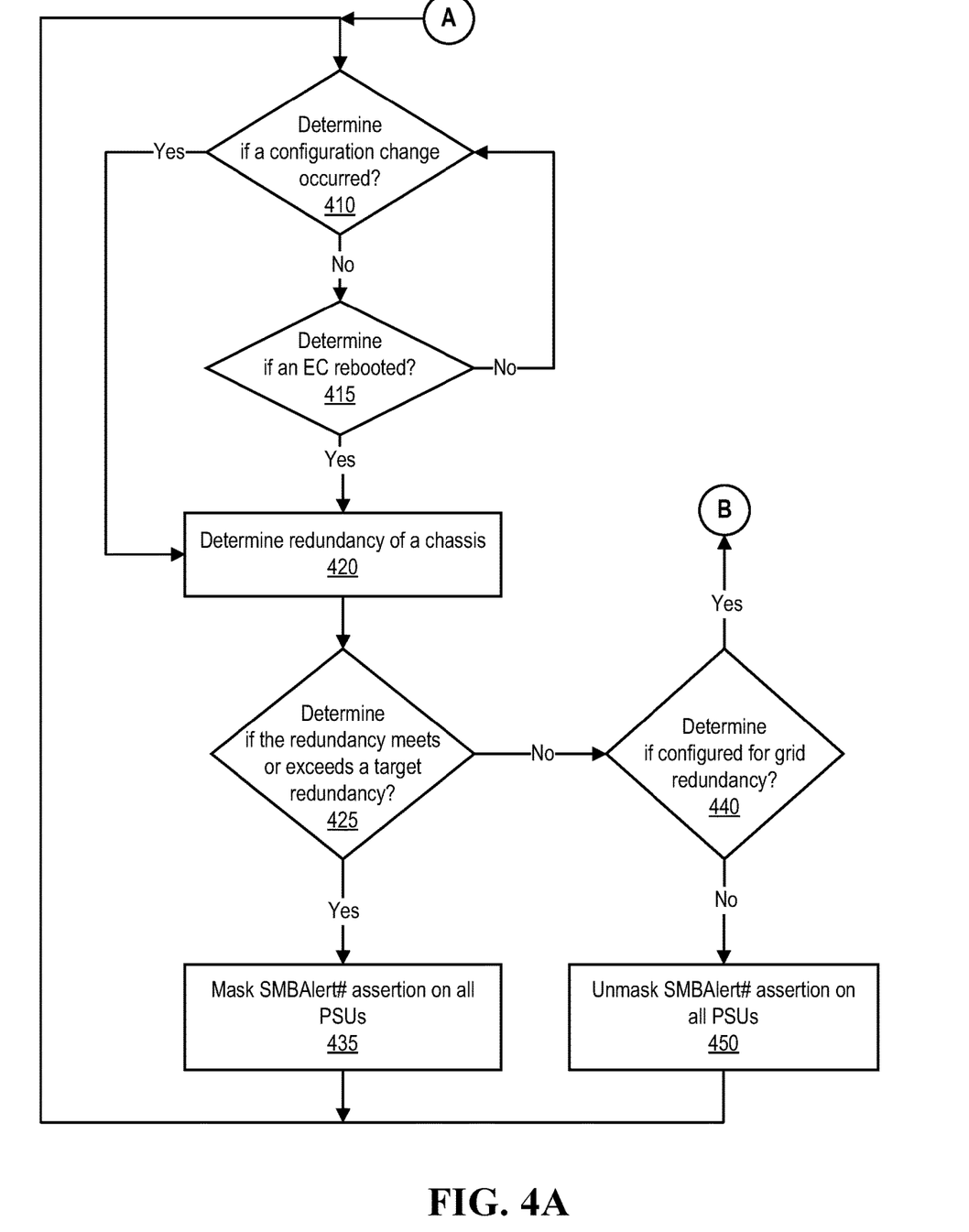
FIGS. 4A and 4B illustrate an example of a method of operating one or more information handling systems, according to one or more embodiments.
Figure 4B:
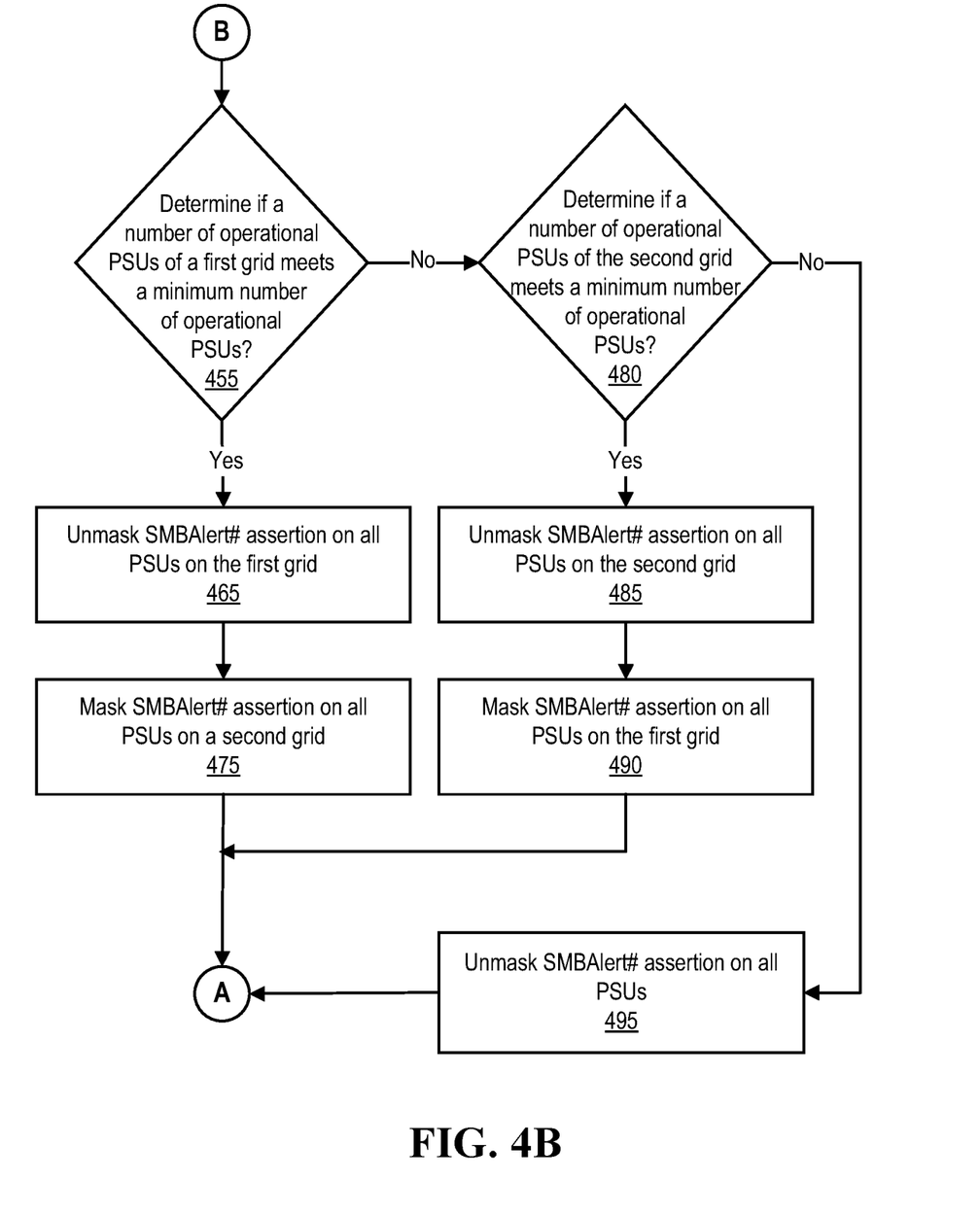

Turning now to FIGS. 4A and 4B, an example of a method of operating one or more information handling systems is illustrated, according to one or more embodiments. At 410, it may be determined if a configuration is changed. For example, an EC 210 may determine if a configuration is changed. In one instance, a configuration change may include a loss of a PSU 240. In a second instance, a configuration change may include an addition of a PSU 240. In a third instance, a configuration change may include a removal of an IHS 110, a fan 230, or a non-volatile memory medium 250, among others. In another instance, a configuration change may include an addition of an IHS 110, a fan 230, or a non-volatile memory medium 250, among others.

If a configuration change occurred, redundancy of the chassis may be determined, at 420. For example, EC 210 may determine redundancy of chassis 200. In one or more embodiments, determining redundancy of a chassis may include determining if a power system of the chassis is redundant. If the power system of the chassis is redundant, determining redundancy of the chassis may include determining if the power system of the chassis is PSU redundant or grid redundant. If the power system of the chassis is grid redundant, determining redundancy of the chassis may include determining PSU populations of each of multiple grids of the power system of the chassis. In one or more embodiments, determining redundancy of the chassis may include determining available power from a power system of the chassis, determining power allocated to the chassis and its components, determining a minimum number of PSUs for redundancy, or any combination of the foregoing, among others.

If a configuration change did not occur, it may be determined if an EC rebooted, at 415. If the EC did not reboot, the method may proceed to 410, according to one or more embodiments. If the EC did reboot, the method may proceed to 420, according to one or more embodiments. At 425, it may be determined if the redundancy meets or exceeds a target redundancy. If the redundancy meets or exceeds the target redundancy, all SMBAlert # assertions on all PSUs may be masked, at 435. For example, masking an SMBAlert # on a PSU may include masking one or more registers of the PSU. For instance, the one or more registers may not cause an assertion of an SMBAlert # signal when the one or more registers are masked. In one or more embodiments, the method may proceed to 410.

If the redundancy does not meets or exceeds the target redundancy, it may be determined if grid redundancy is configured, at 440. If grid redundancy is not configured, all SMBAlert # assertions on all PSUs may be unmasked, at 450. For example, unmasking an SMBAlert # on a PSU may include unmasking one or more registers of the PSU. For instance, the one or more registers may cause an assertion of an SMBAlert # signal when the one or more registers are unmasked. In one or more embodiments, the method may proceed to 410.

If grid redundancy is configured, it may be determined if a number of operational PSUs of a first grid meets a minimum number of operational PSUs, at 455. If the number of operational PSUs of the first grid meets the minimum number of operational PSUs, all SMBAlert # assertions on all PSUs of the first grid may be unmasked, at 465. For example, unmasking an SMBAlert # on a PSU of the first grid may include unmasking one or more registers of the PSU of the first grid. For instance, the one or more registers may cause an assertion of an SMBAlert # signal when the one or more registers are unmasked. At 475, all SMBAlert # assertions on all PSUs of a second grid may be masked. For example, masking an SMBAlert # on a PSU of the second grid may include masking one or more registers of the PSU of the second grid. For instance, the one or more registers may not cause an assertion of an SMBAlert # signal when the one or more registers are masked. In one or more embodiments, the method may proceed to 410.

If the number of operational PSUs of the first grid does not meet the minimum number of operational PSUs, it may be determined if a number of operational PSUs of the second grid meets the minimum number of operational PSUs, at 480. If the number of operational PSUs of the second grid does not meet the minimum number of operational PSUs, all SMBAlert # assertions on all PSUs may be unmasked, at 495. For example, unmasking an SMBAlert # on a PSU may include unmasking one or more registers of the PSU. For instance, the one or more registers may cause an assertion of an SMBAlert # signal when the one or more registers are unmasked. In one or more embodiments, the method may proceed to 410.

If the number of operational PSUs of the second grid meets the minimum number of operational PSUs, all SMBAlert # assertions on all PSUs of the second grid may be unmasked, at 485. For example, unmasking an SMBAlert # on a PSU of the second grid may include unmasking one or more registers of the PSU of the second grid. For instance, the one or more registers may cause an assertion of an SMBAlert # signal when the one or more registers are unmasked. At 490, all SMBAlert # assertions on all PSUs of the first grid may be masked. For example, masking an SMBAlert # on a PSU of the first grid may include masking one or more registers of the PSU of the first grid. For instance, the one or more registers may not cause an assertion of an SMBAlert # signal when the one or more registers are masked. In one or more embodiments, the method may proceed to 410.

Figure 5:
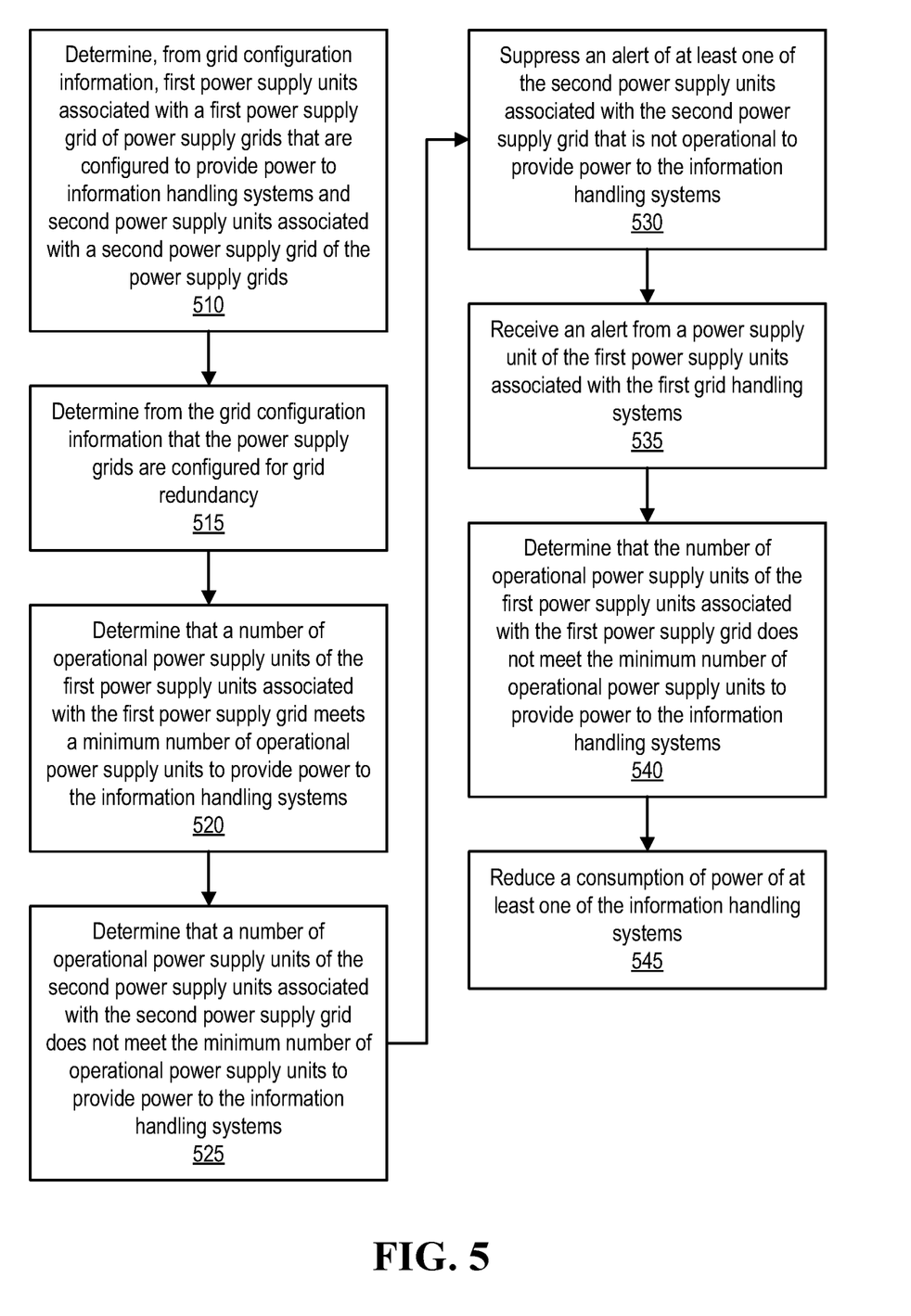
FIG. 5 illustrates another example of a method of operating one or more information handling systems, according to one or more embodiments.

Turning now to FIG. 5, another example of a method of operating one or more information handling systems is illustrated, according to one or more embodiments. At 510, first power supply units associated with a first power supply grid of power supply grids that are configured to provide power to information handling systems and second power supply units associated with a second power supply grid of the power supply grids may be determined from grid configuration information.

At 515, it may be determined from the grid configuration information that the power supply grids are configured for grid redundancy. At 520, it may be determined that a number of operational power supply units of the first power supply units associated with the first power supply grid meets a minimum number of operational power supply units to provide power to the information handling systems. At 525, it may be determined that a number of operational power supply units of the second power supply units associated with the second power supply grid does not meet the minimum number of operational power supply units to provide power to the information handling systems.

In one or more embodiments, a redundancy sensor may determine that a number of operational power supply units of the second power supply units associated with the second power supply grid does not meet the minimum number of operational power supply units to provide power to the information handling systems. In one example, the redundancy sensor may be or include circuitry. In another example, the redundancy sensor may be or include firmware. In one instance, the firmware associated with the redundancy sensor may be or include firmware associated with BMC 185. In another instance, the firmware associated with the redundancy sensor may be or include firmware associated with EC 210.

At 530, an alert of at least one of the second power supply units associated with the second power supply grid that is not operational to provide power to the information handling systems may be suppressed. In one or more embodiments, suppressing an alert of at least one of the second power supply units associated with the second power supply grid that is not operational to provide power to the information handling systems may be performed in response to determining that the number of operational power supply units of the second power supply units associated with the second power supply grid does not the minimum number of operational power supply units to provide power to the information handling systems.

In one or more embodiments, suppressing the alert of the at least one of the second plurality of power supply units associated with the second grid may include configuring the at least one of the second power supply units associated with the second grid to not assert the alert. For example, configuring the at least one of the second power supply units associated with the second grid to not assert the alert may include configuring a register of the at least one of the second power supply units associated with the second grid. For instance, a configuration of the register of the at least one of the second power supply units associated with the second grid may suppress generating the alert. In one or more embodiments, configuring the register of the at least one of the second power supply units associated with the second grid may include providing, to a power management bus, a command that configures the register of the at least one of the second power supply units associated with the second grid which suppresses generating the alert. For example, the at least one of the second power supply units associated with the second grid may receive, via the power management bus, the command that configures the register of the at least one of the second power supply units associated with the second grid which suppresses generating the alert.

At 535, an alert from a power supply unit of the first power supply units associated with the first grid may be received. For example, the power supply unit of the first power supply units associated with the first grid may be associated with an issue. In one instance, the issue may be or include a malfunction of the power supply unit of the first power supply units associated with the first grid. In another instance, the issue may be or include a malfunction of the power supply unit of the first power supply units associated with the first grid may be or include a failure of the power supply unit of the first power supply units associated with the first grid.

540, it may be determined that the number of operational power supply units of the first power supply units associated with the first power supply grid does not meet the minimum number of operational power supply units to provide power to the information handling systems. In one or more embodiments, determining that the number of operational power supply units of the first power supply units associated with the first power supply grid does not meet the minimum number of operational power supply units to provide power to the information handling systems may be performed in response to receiving the alert from the power supply unit of the first power supply units associated with the first power supply grid.

545, a consumption of power of at least one of the information handling systems may be reduced. In one or more embodiments, reducing a consumption of power of at least one of the information handling systems may be performed in response to determining that the number of operational power supply units of the first power supply units associated with the first power supply grid does not meet the minimum number of operational power supply units to provide power to the information handling systems.

In one or more embodiments, reducing the consumption of power of at least one of the information handling systems may include reducing an information processing capacity of the at least one of the information handling systems. For example, at least one processor of the at least one of the information handling systems may be configured to consume less power. For instance, the at least one processor of the at least one of the information handling systems may process less information within a time period when the at least one processor of the at least one of the information handling systems is configured to consume less power. In one or more embodiments, the at least one processor of the at least one of the information handling systems may execute instructions at a slower clock rate when the at least one processor of the at least one of the information handling systems is configured to consume less power.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
   a chassis configured to house a plurality of information handling systems and a plurality of power supply grids; and
   an enclosure controller that is coupled to the plurality of information handling systems and that is configured to:
   determine, from grid configuration information, a first plurality of power supply units associated with a first power supply grid of the plurality of power supply grids that are configured to provide power to the plurality of information handling systems and a second plurality of power supply units associated with a second power supply grid of the plurality of power supply grids;
   determine from the grid configuration information that the plurality of power supply grids are configured for grid redundancy;
   determine that a number of operational power supply units of the first plurality of power supply units associated with the first power supply grid meets a minimum number of operational power supply units to provide power to the plurality of information handling systems;
   determine that a number of operational power supply units of the second plurality of power supply units associated with the second power supply grid does not meet the minimum number of operational power supply units to provide power to the plurality of information handling systems; and
   in response to determining that the number of operational power supply units of the second plurality of power supply units associated with the second power supply grid does not meet the minimum number of operational power supply units to provide power to the plurality of information handling systems, suppress an alert of at least one of the second plurality of power supply units associated with the second power supply grid that is not operational to provide power to the plurality of information handling systems.

2. The system of claim 1, wherein, to suppress the alert of the at least one of the second plurality of power supply units associated with the second grid, the enclosure controller is further configured to configure the at least one of the second plurality of power supply units associated with the second grid to not assert the alert.

3. The system of claim 2,
wherein, to configure the at least one of the second plurality of power supply units associated with the second grid to not assert the alert, the enclosure controller is further configured to configure a register of the at least one of the second plurality of power supply units associated with the second grid; and
wherein a configuration of the register of the at least one of the second plurality of power supply units associated with the second grid suppresses generating the alert.

4. The system of claim 3, wherein, to configure the register of the at least one of the second plurality of power supply units associated with the second grid, the enclosure controller is further configured to provide, to a power management bus, a command that configures the register of the at least one of the second plurality of power supply units associated with the second grid which suppresses generating the alert.

5. The system of claim 1, the enclosure controller is further configured to:
receive an alert from a power supply unit of the first plurality of power supply units associated with the first power supply grid;
in response to receiving the alert from the power supply unit of the first plurality of power supply units associated with the first power supply grid, determine that the number of operational power supply units of the first plurality of power supply units associated with the first power supply grid does not meet the minimum number of operational power supply units to provide power to the plurality of information handling systems; and
in response to determining that the number of operational power supply units of the first plurality of power supply units associated with the first power supply grid does not meet the minimum number of operational power supply units to provide power to the plurality of information handling systems, reduce a consumption of power of at least one of the plurality of information handling systems.

6. The system of claim 5, wherein, to reduce the consumption of power of the at least one of the plurality of information handling systems includes, the enclosure controller is further configured to reduce an information processing capacity of the at least one of the plurality of information handling systems.

7. The system of claim 1, wherein the at least one of the second plurality of power supply units associated with the second power supply grid that is not operational to provide power to the plurality of information handling systems is removable without ceasing operations of the plurality of information handling systems.

8. A method, comprising:
determining, from grid configuration information, a first plurality of power supply units associated with a first power supply grid of a plurality of power supply grids that are configured to provide power to a plurality of information handling systems and a second plurality of power supply units associated with a second power supply grid of the plurality of power supply grids;
determining from the grid configuration information that the plurality of power supply grids are configured for grid redundancy;
determining that a number of operational power supply units of the first plurality of power supply units associated with the first power supply grid meets a minimum number of operational power supply units to provide power to the plurality of information handling systems;
determining that a number of operational power supply units of the second plurality of power supply units associated with the second power supply grid does not meet the minimum number of operational power supply units to provide power to the plurality of information handling systems; and
in response to the determining that the number of operational power supply units of the second plurality of power supply units associated with the second power supply grid does not meet the minimum number of operational power supply units to provide power to the plurality of information handling systems, suppressing an alert of at least one of the second plurality of power supply units associated with the second power supply grid that is not operational to provide power to the plurality of information handling systems.

9. The method of claim 8, wherein the suppressing the alert of the at least one of the second plurality of power supply units associated with the second grid includes configuring the at least one of the second plurality of power supply units associated with the second grid to not assert the alert.

10. The method of claim 9,
wherein the configuring the at least one of the second plurality of power supply units associated with the second grid to not assert the alert includes configuring a register of the at least one of the second plurality of power supply units associated with the second grid; and
wherein a configuration of the register of the at least one of the second plurality of power supply units associated with the second grid suppresses generating the alert.

11. The method of claim 10, wherein the configuring the register of the at least one of the second plurality of power supply units associated with the second grid includes providing, to a power management bus, a command that configures the register of the at least one of the second plurality of power supply units associated with the second grid which suppresses generating the alert.

12. The method of claim 8, further comprising:
receiving an alert from a power supply unit of the first plurality of power supply units associated with the first power supply grid;
in response to the receiving the alert from the power supply unit of the first plurality of power supply units associated with the first power supply grid, determining that the number of operational power supply units of the first plurality of power supply units associated with the first power supply grid does not meet the minimum number of operational power supply units to provide power to the plurality of information handling systems; and in response to the determining that the number of operational power supply units of the first plurality of power supply units associated with the first power supply grid does not meet the minimum number of operational power supply units to provide power to the plurality of information handling systems, reducing a consumption of power of at least one of the plurality of information handling systems.

13. The method of claim 12, wherein the reducing the consumption of power of the at least one of the plurality of information handling systems includes reducing an information processing capacity of the at least one of the plurality of information handling systems.

14. The method of claim 8, wherein the determining that the number of operational power supply units of the second plurality of power supply units associated with the second power supply grid does not meet the minimum number of operational power supply units to provide power to the plurality of information handling systems includes a redundancy sensor determining that the number of operational power supply units of the second plurality of power supply units associated with the second power supply grid does not meet the minimum number of operational power supply units to provide power to the plurality of information handling systems.

15. A computer-readable non-transitory memory medium that includes processor instructions that, when executed by at least one processor of an enclosure controller, cause the enclosure controller to:

determine, from grid configuration information, a first plurality of power supply units associated with a first power supply grid of a plurality of power supply grids that are configured to provide power to a plurality of information handling systems and a second plurality of power supply units associated with a second power supply grid of the plurality of power supply grids;

determine from the grid configuration information that the plurality of power supply grids are configured for grid redundancy;

determine that a number of operational power supply units of the first plurality of power supply units associated with the first power supply grid meets a minimum number of operational power supply units to provide power to the plurality of information handling systems;

determine that a number of operational power supply units of the second plurality of power supply units associated with the second power supply grid does not meet the minimum number of operational power supply units to provide power to the plurality of information handling systems; and in response to determining that the number of operational power supply units of the second plurality of power supply units associated with the second power supply grid does not meet the minimum number of operational power supply units to provide power to the plurality of information handling systems, suppress an alert of at least one of the second plurality of power supply units associated with the second power supply grid that is not operational to provide power to the plurality of information handling systems.

16. The enclosure controller of claim 15, wherein, to suppress the alert of the at least one of the second plurality of power supply units associated with the second grid, the enclosure controller is further configured to configure the at least one of the second plurality of power supply units associated with the second grid to not assert the alert.

17. The enclosure controller of claim 16,
wherein, to configure the at least one of the second plurality of power supply units associated with the second grid to not assert the alert, the enclosure controller is further configured to configure a register of the at least one of the second plurality of power supply units associated with the second grid; and
wherein a configuration of the register of the at least one of the second plurality of power supply units associated with the second grid suppresses generating the alert.

18. The enclosure controller of claim 17, wherein, to configure the register of the at least one of the second plurality of power supply units associated with the second grid, the enclosure controller is further configured to provide, to a power management bus, a command that configures the register of the at least one of the second plurality of power supply units associated with the second grid which suppresses generating the alert.

19. The enclosure controller of claim 1, the enclosure controller is further configured to:

receive an alert from a power supply unit of the first plurality of power supply units associated with the first power supply grid;

in response to receiving the alert from the power supply unit of the first plurality of power supply units associated with the first power supply grid, determine that the number of operational power supply units of the first plurality of power supply units associated with the first power supply grid does not meet the minimum number of operational power supply units to provide power to the plurality of information handling systems; and in response to determining that the number of operational power supply units of the first plurality of power supply units associated with the first power supply grid does not meet the minimum number of operational power supply units to provide power to the plurality of information handling systems, reduce a consumption of power of at least one of the plurality of information handling systems.

20. The enclosure controller of claim 19, wherein, to reduce the consumption of power of the at least one of the plurality of information handling systems includes, the enclosure controller is further configured to reduce an information processing capacity of the at least one of the plurality of information handling systems.

* * * * *